Jan. 15, 1952     M. FRACHON     2,582,825
OPENING-LIMITING SYSTEM FOR TURBINE REGULATORS
Filed Feb. 5, 1948
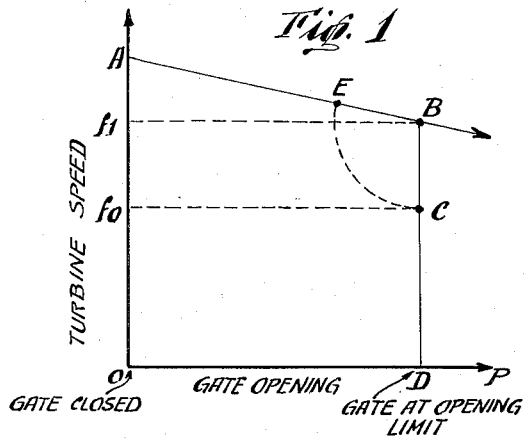
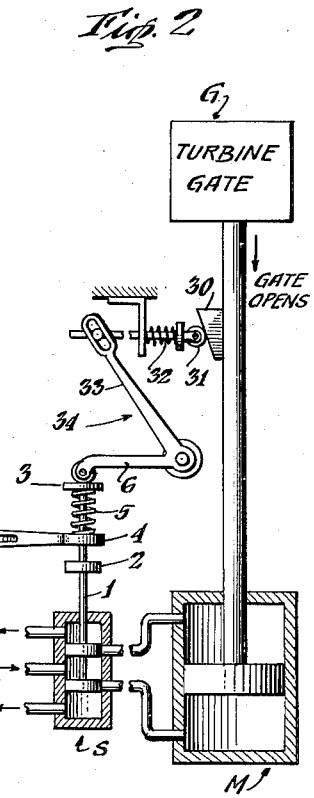
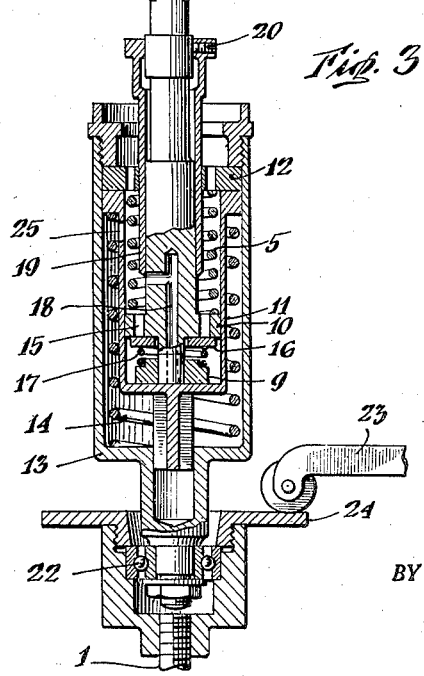
INVENTOR.
Maurice Frachon
BY
George H. Corey
ATTORNEY Patented Jan. 15, 1952

2,582,825

UNITED STATES PATENT OFFICE 2,582,825

OPENING-LIMITING SYSTEM FOR TURBINE REGULATORS

Maurice Frachon, Grenoble, France, assignor to Ateliers Neyret-Beylier & Piccard-Pictet, Grenoble, France, a corporation of France Application February 5, 1948, Serial No. 6,439
In France June 4, 1946

Section 1, Public Law 690, August 8, 1946
Patent expires June 4, 1966

8 Claims. (Cl. 137—158)

An object of the present invention is to provide improvements in the automatic governors of prime movers and more particularly in the so-called "opening limiting devices" as frequently employed in hydraulic turbines.

It is known that an opening limiting device has the function of preventing any movement of the shank or rod of the distributor valve in the direction adapted to open the gating of the turbine, beyond a predetermined opening.

In the drawings,

Fig. 1 illustrates the speed droop characteristic curve of a governor having an opening limit control.

Fig. 2 illustrates diagrammatically a governor provided with an opening limit control in accordance with the teachings of the prior art.

Fig. 3 is a cross-sectional view of a motion transmitting apparatus constructed in accordance with the present invention, which may be inserted in the governor of Fig. 2 to modify its characteristic.

The curve of Fig. 1 comprises a portion AB of limited speed droop and a vertical portion BD throughout which the speed changes without the gate opening being altered.

Should however the speed of the turbine exceed the point B of the graph, the governor will bring about closure of the gating.

Fig. 2 illustrates diagrammatically a typical opening limiting system of the prior art. In this figure, a device 7 responsive to the turbine speed, positions a lever 4 connected to the shank or stem 1 of a distributor valve or relay valve S controlling a servo-motor M which drives the turbine gate valve mechanism G.

The distributor valve shank 1 comprises two stops 2 and 3 between which the end of the floating lever 4 may slide.

A spring 5 urges the valve shank upwards from the floating lever end and biases the latter into engagement with the stop 2. The strength of this spring should be greater than the forces applied to the valve, but it should be as low as possible, as should also be the droop of the spring so as not to increase unduly the stresses exerted on the pivotal connections and the floating lever when said spring 5 is compressed. The assembly 1, 2, 3, 4, 5 may be designated as an expansible valve shank or rod.

The servo-motor M, as it drives the gate valve mechanism G, simultaneously operates an opening limiting mechanism including a cam 30, a follower 31, a rod 32, and arms 33 and 6 of a bell-crank lever generally indicated at 34. A pin-and-slot connection is provided between rod 32 and arm 33 of the bell-crank lever 34. During normal operation, before the maximum gate opening is reached, the arm or finger 6 is spaced from the stop 3 and does not affect the operation of the distributor valve S.

Thus, as long as the opening limiting device is inoperative, the valve shank will accurately follow up the movements of the floating lever. When a predetermined opening and therefore a predetermined speed of the turbine has been reached, the finger 6 is lowered a sufficient amount to prevent any movement of the valve shank above the intermediate position thereof, that is to prevent any further opening movement of the gate.

The corresponding operating point on the speed droop characteristic is B. In other words, the gate is fully open and the turbine speed is indicated by the ordinate of B.

Should there occur a further drop in the speed of the turbine the end of the lever is raised, disengaging the stop 2 and compressing the spring since the shank is no longer able to rise and the gate therefore remains stationary. The parts are shown in this position in Fig. 2. The limiting device may then be said to be "stuck." The figurative point on the characteristic is then between B and D.

The advantage of the above described system is that it avoids causing the pivotal connections of the floating lever and also the speed responsive device to sustain the stresses to which they would be subjected for a given variation in the speed of the turbine, if the floating lever itself were locked without any resilient clearance therein.

Unfortunately, when the limiting device is stuck in the manner described, an increase in the speed of the turbine will not at once bring about closure, since the valve shank cannot start its downward motion before the end of the floating lever has again engaged the stop 2, that is until the operating point reaches B on the speed droop characteristic.

Now in actual working practice, the users often adjust their limiting device at a very low value, that is to select an operating point at normal turbine speed C which is appreciably lower than the point B, or rather adjust the ordinate of the point B, through controlling the speed, appreciably above the normal speed. In this way, they are assured of maintaining a thoroughly constant degree of opening in their unit and supplying the contract power output even should the speed increase. On the other hand, if the normal operating point has been positioned at B, upon the speed increasing above normal, the governor would at once have closed the gate.

However, there is a serious drawback in selecting an operating point C which is too low on the speed droop characteristic, especially in the event of a switch-off and sometimes in that of a partial unloading. Namely, it will then be necessary, to wait until the speed of the unit disconnected rises up to the point B, to allow the governor to initiate its closing movement. Thus the governor will have not immediately performed its function in limiting racing of the unit.

This can lead to the production of overspeeds much higher than those for which provision had initially been made.

The present invention makes it possible to eliminate this drawback. It essentially consists in inserting between the floating lever and the distributor valve shank (already connected with a spring) a dash-pot so arranged as to momentarily prevent any relative movement of the lever with respect to the valve shank, in the event of an increase in speed of the turbine, while not opposing relative movement in the opposite direction.

This being so, when the limiting device is stuck, regardless of the distance from the floating lever to the closure stop and as the speed rises the valve shank will be lowered together with the end of the floating lever and will at once bring about closure, after which the dash-pot will gradually "deflate under the action of the spring, and the valve shank will be restored to the position assigned to it by the stop with respect to the floating lever.

Thus, the valve at such times is not moved in response to slow speed variations in either direction while on the other hand it moves quickly in a closing direction in response to sudden increases in the speed of the turbine.

The operating point will then be located along the portion AB of the speed droop characteristic.

In Fig. 1 there has been indicated by way of illustration as at CE the approximate locus of the figurative point in this case.

To provide a clear understanding of the invention and to indicate possible embodiments thereof, one construction selected for purposes of exemplification and not of limitation will now be described with reference to the accompanying Figure 3.

The floating lever 4 transmits its displacements to the valve shank 1 through the system forming the subject of the present invention. Said system comprises a rod 8 terminating in a flange 9 fitted thereon and comprising a shoulder 10 slidable in a cup member 11. A spring 5 bears against a shoulder 12 rigid with a cup member 13 connected with the shank of the valve 1. Said spring tends to apply the flange 9 against the bottom or end wall of the cup 11. The latter may slide in the cup member 13. A spring 14 urges it into engagement with the shoulder 12. The initial or pre-load compression of the spring 14 is selected slightly greater than that of the spring 5. The assembly including both cups is filled with oil, and an opening 25 is provided in cup 11 to permit the passage of the oil between the two cups. The shoulder 10 is perforated with holes 15 adapted to be sealed with an annular check-valve 16 applied through a spring 17.

The rod 8 is formed with an axial duct 18 in parallel relationship with the holes 15. The upper aperture of the duct 18 is adapted to be sealed to a variable extent through a liner member 19 the position of which relative to the rod 8 may be set by means of a set-screw 20. Universal connections including ball means 21 and 22 provide for the transmission of movement. This device operates as follows:

In the absence of an opening limiting device, the distance 21—22 remains constant. As the finger 23 engages the shoulder 24 and the floating lever tends to continue its upward movement, the spring 5 is compressed just as in Fig. 2. The function of the spring 14 is merely to prevent the floating lever from being locked in a downward direction in case the valve-shank 1 is locked. The cup 11 therefore is normally at all times in engagement with its related stop 9 regardless of the initial precompression load of the spring 5, which precompression load is for this purpose elected at a lower value than that of the spring 14. The upward movement of the rod 8 with respect to the cups 11 and 13 may be freely effected by compressing the spring 5, the check-valve member 16 being then automatically spaced away from its seat. The limiting device is then "stuck."

If thereafter an increase in speed occurs the rod 8 moves and since the check valve is applied against its seat there can be no relative motion of the rod with respect to the cup, except as a function of the metered amount of oil adapted to flow through the port 18, this providing the desired dash-pot effect.

The valve-shank 1 is therefore displaced downwardly in response to the speed increase and remains so displaced until the expiration of the time required for the spring 5, acting against the dashpot, either to move the bottom of the cup 11 back against the flange 9, or to move the shoulder 24 back into engagement with the finger 23 of the limiting device, which may occur before the cup 11 engages the flange 9.

It will be understood that the interposal of the dash-pot by no means prevents the corresponding movement of the floating lever in case of a reduction in speed, while positively causing the closing movement to occur even with the spring 5 compressed.

The invention is in no way limited to the form of embodiment described, but comprises within its scope any operative modifications thereof and in particular those wherein the tachometer or any other suitable indicating apparatus is made to transmit its indications to the servo-motor relay by means of a resilient system and of a system operating as a dash-pot.

It further is not restricted to any particular form of connection from the floating lever or the corresponding member of any other suitable type of governor in any specific embodiment, with the servo-motor relay.

What I claim is:

1. Regulating apparatus for a prime mover comprising a device responsive to the speed of the prime mover, a device for controlling the supply of motive fluid to said prime mover, means connecting said devices so that said fluid supply control device normally follows the movements of said speed responsive device, a stop for limiting the movements of said fluid supply control device in a fluid supply increasing direction, yieldable means in said connecting means to permit continued movement of said speed responsive device in a fluid supply increasing direction after said fluid supply control device is stopped by said stop, and means in said connecting means for causing said fluid supply control device to follow a movement of the speed responsive device in a fluid supply decreasing direction immediately after such a continued movement of said speed responsive device in a fluid supply increasing direction.

2. Regulating apparatus for a prime mover comprising a device responsive to the speed of the prime mover, a device for controlling the supply of motive fluid to said prime mover, a first element connected to the speed responsive device for concurrent movement therewith, a second element connected to the controlling device for concurrent movement therewith, a stop for limiting the movement of said second element in a fluid supply increasing direction, means connecting said elements so that said second element normally follows the movements of said first element, yieldable means in said connecting means to permit continued movement of said first element in a fluid supply increasing direction after said second element engages said stop, and a one-way dashpot connecting said elements for permitting such continued movement and for causing said second element to follow a movement of the first element in a fluid supply decreasing direction immediately after such a continued movement of said first element in a fluid supply increasing direction.

3. Regulating apparatus for a prime mover comprising a device responsive to the speed of the prime mover, a device for controlling the supply of motive fluid to said prime mover, a first element connected to the speed responsive device for concurrent movement therewith, a second element connected to the controlling device for concurrent movement therewith, a stop for limiting the movement of said second element in a fluid supply increasing direction, an abutment on said second element toward which said first element moves in a fluid supply decreasing direction, means biasing said first element into engagement with said abutment, said biasing means being effective to permit said first element to move away from said abutment when said second element engages said stop, and a one-way dashpot connecting said elements so as to cause said second element to follow a movement of the first element in a fluid supply decreasing direction while the first element is spaced from the abutment.

4. Regulating apparatus for a prime mover comprising a device responsive to the speed of the prime mover, a device for controlling the supply of motive fluid to said prime mover, a rod connected to the speed responsive device for concurrent movement therewith, a piston attached to said rod, a fluid filled cylinder receiving said piston and connected to the controlling device for concurrent movement therewith, stop means for limiting the movement of said cylinder in a fluid supply increasing direction, means biasing said piston toward that end of the cylinder which it normally engages when driving the fluid supply control device in a fluid supply decreasing direction, said biasing means being effective to permit continued movement of said piston in a fluid supply increasing direction after said cylinder is stopped by said stop means, a first fluid passage connecting the ends of the cylinder, a check valve controlling said passage for permitting free movement of fluid therethrough when said piston moves in a fluid supply increasing direction and preventing movement of fluid therethrough when the piston moves in a fluid supply decreasing direction, so that the cylinder follows fluid supply decreasing movements of the piston, and a second fluid passage connecting the ends of the cylinder including a restriction.

5. Regulating apparatus for a prime mover comprising a device responsive to the speed of the prime mover, a device for controlling the supply of motive fluid to said prime mover, a rod connected to the speed responsive device for concurrent movement therewith, a piston attached to said rod, a fluid filled cylinder receiving said piston and connected to the controlling device for concurrent movement therewith, stop means for limiting the movement of said cylinder in a fluid supply increasing direction, means biasing said piston toward that end of the cylinder which it normally engages when driving the fluid supply control device in a fluid supply decreasing direction, said biasing means being effective to permit continued movement of said piston in a fluid supply increasing direction after said cylinder is stopped by said stop means, a first fluid passage connecting the ends of the cylinder, a check valve controlling said passage for permitting free movement of fluid therethrough when said piston moves in a fluid supply increasing direction and preventing movement of fluid therethrough when the piston moves in a fluid supply decreasing direction so that the cylinder follows fluid supply decreasing movements of the piston, a second fluid passage connecting the ends of the cylinder and terminating in an aperture in said piston rod, a sleeve on said piston rod having one end movable over the aperture to form a restriction in said second passage and its other end extending outside said cylinder and adjustable means for connecting said outside end to said rod to permit adjustment of the area of said restriction.

6. Apparatus for transmitting motion, comprising a first element movable over a predetermined range, a second element having a range of movement limited as compared to that of the first element, an abutment on said second element, means biasing a portion of said first element into engagement with the abutment, said biasing means being effective when said second element reaches one end of its range of movement to permit continued movement of the first element so as to separate said portion from said abutment, and a one-way dashpot connecting said elements so as to cause said second element to follow a movement of the first element while said portion is spaced from said abutment.

7. Apparatus for transmitting motion, comprising a first element movable over a predetermined range, a second element having a range of movement limited as compared to that of the first element, a rod connected to the first element for concurrent movement therewith, a piston attached to said rod, a fluid filled cylinder receiving said piston and connected to the second element for concurrent movement therewith, stop means for limiting the movement of said second element in one direction, means biasing said piston toward that end of the cylinder which it normally engages when driving the cylinder in the opposite direction, said biasing means being effective to permit continued movement of said piston in said one direction after said cylinder is stopped by said stop means, a first fluid passage connecting the ends of the cylinder, a check valve in said passage for permitting free movement of fluid therethrough when said piston moves in said one direction and preventing movement of fluid therethrough when the piston moves in the opposite direction, so that the cylinder then follows the movement of the piston, a second fluid passage connecting the ends of the cylinder including an aperture in said piston rod, a sleeve on said piston rod having one end movable over the aperture to form a restriction in said second passage and its other end extending outside said cylinder, and adjustable means for connecting said outside end to said rod to permit adjustment of the area of said restriction.

8. Apparatus for transmitting motion, comprising a first element movable over a predetermined range, a second element having a range of movement limited as compared to that of the first element, a rod connected to the first element for concurrent movement therewith, a piston attached to the rod, a cylinder receiving said piston and open at the end through which the rod passes, an external flange on the cylinder at said end, a second cylinder concentric with and receiving said first cylinder so that the flange acts as a piston in said second cylinder, said second cylinder being closed at both ends except for an aperture at one end for passage of said piston rod, a first spring compressed between the flange and the opposite end of the second cylinder and biasing the first cylinder toward said one end of the second cylinder, a second spring compressed between said one end of the second cylinder and the piston and biasing the piston toward the closed end of said first cylinder, a first passage connecting the ends of the first cylinder and including a check valve to permit free movement of the piston in one direction, and a second passage connecting the ends of the first cylinder and including a restriction, said spring being effective upon movement of the first element to drive the second element until it reaches the end of its range of movement and thereafter to permit continued movement of the first element, said piston and passages forming a one-way dashpot to cause said first and second element to move concurrently upon a reversal of said first element when said second element is at one end of its range of movement.

MAURICE FRACHON.

REFERENCES CITED

The following references are of record in the file of this patent:

UNITED STATES PATENTS

| Number | Name | Date |
|---|---|---|
| 1,135,923 | Reynolds | Apr. 13, 1915 |
| 1,628,621 | Taylor | May 10, 1927 |
| 1,761,596 | Taylor | June 3, 1930 |
| 2,260,634 | Mullner | Oct. 28, 1941 |